United States Patent
He

(10) Patent No.: US 11,677,654 B1
(45) Date of Patent: Jun. 13, 2023

(54) NETWORK TAP CAPABLE OF TAPPING A 10GBPS NETWORK LINK

(71) Applicant: Ziqiang He, Danville, CA (US)

(72) Inventor: Ziqiang He, Danville, CA (US)

(*) Notice: Subject to any disclaimer, the term of this patent is extended or adjusted under 35 U.S.C. 154(b) by 0 days.

(21) Appl. No.: 17/564,246

(22) Filed: Dec. 29, 2021

(51) Int. Cl.
*H04L 43/50* (2022.01)
*H04J 3/06* (2006.01)
*H04B 1/3877* (2015.01)
*H04W 88/08* (2009.01)

(52) U.S. Cl.
CPC .......... *H04L 43/50* (2013.01); *H04B 1/3877* (2013.01); *H04J 3/0685* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 4,808,944 A * | 2/1989 | Taylor | | H03F 3/45381 |
| | | | | 330/261 |
| 10,135,643 B1 * | 11/2018 | Kong | | H04L 25/03057 |
| 10,637,776 B2 * | 4/2020 | Iwasaki | | H04L 45/60 |
| 11,063,561 B1 * | 7/2021 | Huang | | H04L 12/40 |
| 11,290,074 B1 * | 3/2022 | Omoumi | | H03F 3/21 |
| 2007/0220357 A1 * | 9/2007 | Vedanabhatla | | H04L 43/0847 |
| | | | | 714/43 |
| 2008/0089693 A1 * | 4/2008 | El-Ahmadi | | H04L 1/0057 |
| | | | | 398/135 |
| 2008/0298804 A1 * | 12/2008 | Noble | | A61B 17/29 |
| | | | | 398/45 |
| 2015/0093073 A1 * | 4/2015 | Wright | | H04B 10/27 |
| | | | | 385/24 |
| 2015/0180760 A1 * | 6/2015 | Rickard | | H04L 25/00 |
| | | | | 370/252 |
| 2018/0034542 A1 * | 2/2018 | Fung | | H04B 10/25891 |
| 2018/0062985 A1 * | 3/2018 | Iwasaki | | H04L 49/355 |
| 2018/0115492 A1 * | 4/2018 | Lessmann | | H04L 43/50 |
| 2019/0245751 A1 * | 8/2019 | Wong | | H04L 47/125 |
| 2020/0073774 A1 * | 3/2020 | Deb | | H04L 12/40032 |
| 2020/0295862 A1 * | 9/2020 | Iwasaki | | H04J 14/0283 |
| 2021/0021514 A1 * | 1/2021 | Iwasaki | | H04L 49/109 |
| 2021/0320843 A1 * | 10/2021 | Pang | | H04L 45/745 |
| 2022/0029649 A1 * | 1/2022 | Epstein | | H04B 1/1607 |
| 2022/0069970 A1 * | 3/2022 | Snowdon | | H04J 3/0667 |

* cited by examiner

Primary Examiner — Lonnie V Sweet

(57) ABSTRACT

A network TAP includes four serial transceivers on a printed circuit board. Each serial transceiver has a medium-dependent interface and a serial differential interface that includes a differential input and a differential output. A passive tap circuit arrangement is configured to be operative at up to 10 Gbps or a higher data rate and configures the differential output signal from the differential output of the first serial transceiver as two single-ended signals that are received respectively by the respective differential inputs of the second and third serial transceivers. It also configures the differential output signal from the differential output of the second serial transceiver as two single-ended signals that are received respectively by the respective differential inputs of the first and fourth serial transceivers. In one embodiment according to the present invention, the four serial transceivers are pluggable transceiver modules.

16 Claims, 2 Drawing Sheets

NETWORK TAP CAPABLE OF TAPPING A 10GBPS NETWORK LINK

CROSS-REFERENCE TO RELATED APPLICATIONS

This application claims the benefit of priority from U.S. Provisional Application No. 63/132,399 filed on Dec. 30, 2020, which is incorporated herein by reference in their entirety.

FIELD OF THE INVENTION

The present invention relates to network monitoring devices. In particular, the present invention relates to a network test access point (TAP) that is capable of tapping a 10 Gbps network link.

BACKGROUND OF THE INVENTION

A network TAP is a network device for capturing bi-directional data streams in a data communication network. Typically, a network TAP is placed as an inline device in a wired network link that connects two end devices such as a network switch and a router without affecting flow of bi-directional data streams running between the two end devices, and at the same time, the network TAP duplicates the data streams and send the duplicated data streams to one or more data packet receiver devices such as a data packet analyzer, a network traffic monitoring device or a data packet storage device.

Most of today's wired data networks are based on Ethernet technology, which is specified and standardized as IEEE 802.3. The IEEE 802.3 standards specify various Ethernet protocols based on the type of cabling or transmission medium and data rates. The transmission medium for Ethernet can be either a copper cabling with coaxial or twisted-pair cables or optical cabling with optical fiber cables, and the data rates used in Ethernet include 10 Mbps, 100 Mbps (Fast Ethernet), 1 Gbps (Gigabit Ethernet), 10 Gbps (10-Gigabit Ethernet) and other higher Ethernet speeds such as 40 Gbps and 100 Gbps. It should be noted that these Ethernet data rates are un-encoded data rates which are lower than the actual transmission line rates or symbol rates. For example, IEEE 802.3 specifies 1000Base-SX Gigabit Ethernet, which relates to Gigabit Ethernet transmission over a short-range multi-mode optical fiber cable, the data rate of the 1000Base-SX Gigabit Ethernet is 1 Gbps and the actual transmission line rate is 1.25 Gbps. As another example, IEEE 802.3 specifies 10 GBase-SR 10-Gigabit Ethernet, which relates to 10-Gigabit Ethernet transmission over a short-range multi-mode optical fiber cable, the data rate of the 10 GBase-SR 10-Gigabit Ethernet is 10 Gbps, and the actual transmission line rate is 10.3125 Gbps.

Accordingly, different network TAPs are needed for use with Ethernet links of different transmission medium and data rates. FIG. 1 shows a system diagram of a conventional network TAP 10. The network TAP 10 has a first network port 21 connected to a first network device 11, a second network port 22 connected to a second network device 12, and a monitor port 23 connected to a data packet receiver device 13 for data packet monitoring or storage. The network TAP 10 further includes a tap circuit arrangement 20 that interconnects the two network ports 21 and 22 and the monitor port 23. What the tap circuit arrangement 20 does is to enable flow of bi-directional data streams that run between the first network device 11 and the second network device 12 respectively, and at the same time the tap circuit arrangement 20 duplicates the bi-directional data streams and sends a copy of the bi-directional data streams to the data packet receiver device 13 via the monitor port 23. The first and second network ports 21 and 22 are also referred to as pass-through ports because they allow the bi-directional data streams to pass through them without affecting their flows.

In practice, an often adopted approach for implementing the tap circuit arrangement 20 is to use an integrated Ethernet switching integrated circuit (IC) chip such as Realtek's RTL8367 that integrates both Ethernet PHYs and a packet switching circuitry into a single IC chip. Specifically, three ports of an Ethernet switching IC chip are used as the two network ports 21 and 22 and the monitor port 23. Also, port-mirroring or a pre-defined packet forwarding scheme is configured and enabled to forward a copy of the respective incoming data streams of the two network ports 21 and 22 to the monitor port 23. As such, the two network devices 11 and 12 can send and receive data packets to and from each other through the two network ports 21 and 22 of the network TAP 10 and at the same time, bi-directional data streams running between the two network devices 11 and 12 are duplicated and forwarded to the packet data receiver device 13 via the monitor port 23.

Such a tap circuit arrangement 20 that employs an Ethernet switching IC chip has been considered a very cost-effective approach for implementing a network TAP for Fast Ethernet (100 Mbps) and Gigabit Ethernet (1 Gbps) because of readily availability of low-cost Fast or Gigabit Ethernet switching IC chips that have been widely used for Ethernet switch products for the small/home office (SOHO) market.

However, using an Ethernet switching IC chip may not be a cost-effective and desirable approach for implementing a network TAP for 10-Gigabit Ethernet. First, a low-cost 10-Gigabit Ethernet switching IC chip may not be widely available because 10-Gigabit Ethernet switching IC chips are usually designed for high-end Ethernet switches for large-size network deployments in places like data centers and big companies, therefore they are understandably much more expensive than Ethernet switching IC chips for Fast Ethernet or Gigabit Ethernet. Secondly, a 10-Gigabit Ethernet switching IC chip generates much more heat, and more comprehensive and complicated thermal arrangements such as using cooling fans will be needed to ensure that the 10-Gigabit Ethernet switching IC chip doesn't become overheated. Such comprehensive and complicated thermal arrangements will inevitably add more material costs. Thirdly, because of a 10-Gigabit Ethernet switching IC chip's much higher operation speed and the higher amount of heat it generates, the reliability of a 10-Gigabit network TAP is relatively reduced, especially when cooling fans are used that usually have a lower reliability than most IC chips and other electronics components.

Another drawback of using an Ethernet switching IC chip to implement a network TAP is that an Ethernet switching IC chip usually has a very short production life span. It is often retired and becomes end of life (EOL) in a couple of years and is replaced by a new Ethernet switching IC chip with more advanced features that is usually not pin-compatible with its predecessor. As a result, the network TAP has to be re-designed with the new Ethernet switching IC chip because the older Ethernet switching IC chip retired by its chip maker may not be available anymore. Understandably, this will add additional burdens and costs in engineering development and product inventory management that otherwise could be avoided.

In view of the foregoing, there is a need for an improved network TAP that is more cost-effective, less dependent on the availability of Ethernet switching IC chips, and capable of tapping 10 Gbps network links.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE INVENTION

Several aspects of the present invention are described below with reference to examples for illustration. It should be understood that numerous specific details, relationships, and methods are set forth to provide a full understanding of the present invention. One skilled in the relevant art, however, will readily recognize that the present invention can be practiced without one or more of the specific details, or with other methods, etc. In other instances, well-known structures or operations are not shown in detail to avoid obscuring the features of the present invention.

Figure 2:
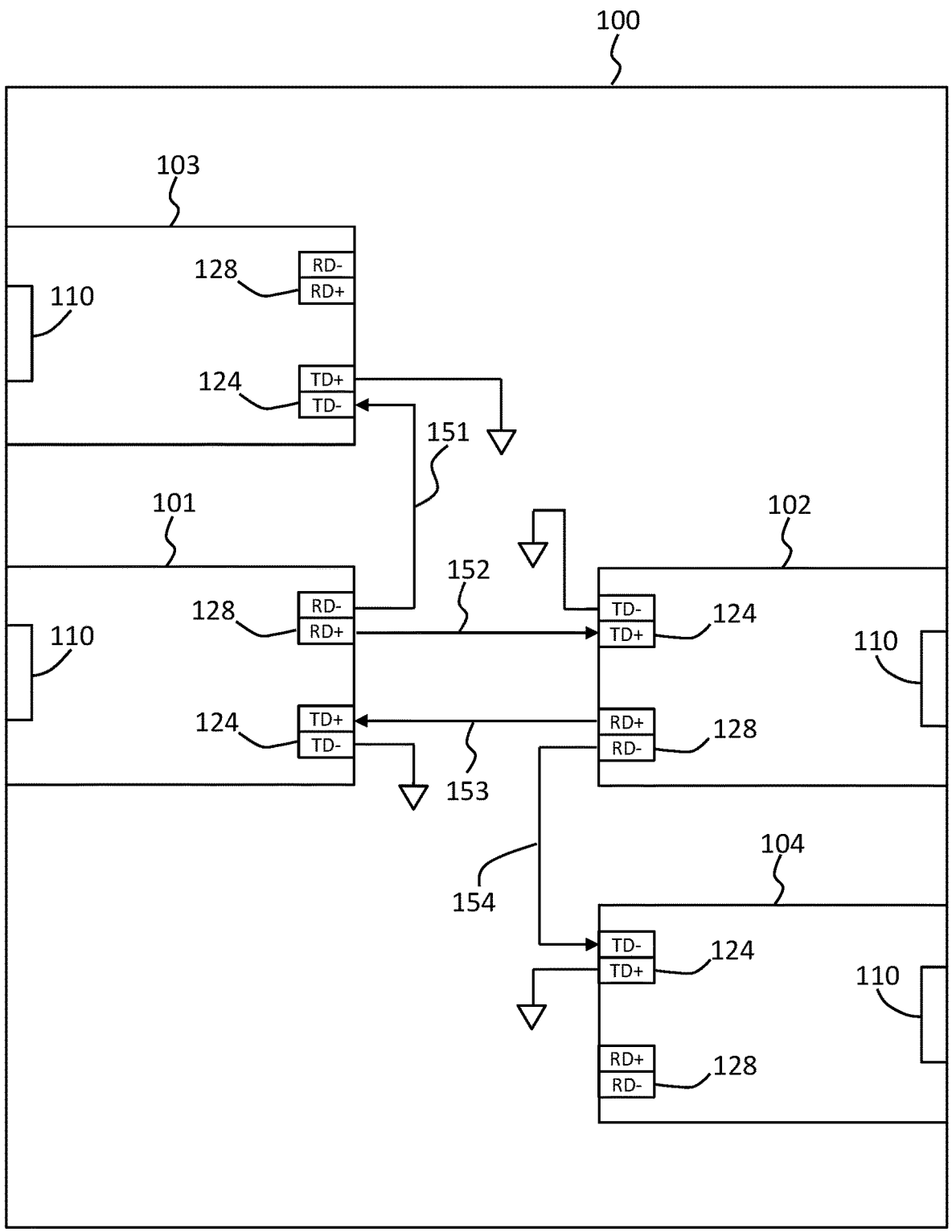
FIG. 2 is a block diagram of a network TAP that is capable of tapping a 10 Gbps network link according to the present invention.

Referring now to FIG. 2 which shows a block diagram of a network TAP 100 according to the present invention, the network TAP 100 has four serial Ethernet transceivers 101-104 that are implemented on a printed circuit board (PCB). Each of the four serial Ethernet transceivers 101-104 has a medium-dependent interface 110 and a serial differential interface that includes a differential input 124 having a positive input terminal TD+ and a negative input terminal TD− and a differential output 128 having a positive output terminal RD+ and a negative terminal RD−. The function of such a serial Ethernet transceiver is to convert an electrical or optical signal representing an incoming data stream that is received by the medium-dependent interface 110 to an electrical differential output signal representing the same incoming data stream that is output from the differential output 128. Inversely, it converts an electrical differential input signal representing an outgoing data stream that is received by the differential input 124 to an electrical or optical signal that is output from the medium-dependent interface 110, representing the same outgoing data stream.

According to the present invention, the first serial Ethernet transceiver 101 and the second serial Ethernet transceiver 102 are interconnected in such a way that the positive output terminal RD+ of the differential output 128 of the first serial Ethernet transceiver 101 is connected to the positive input terminal TD+ of the differential input 124 of the second serial Ethernet transceiver 102 by a PCB copper trace 152, and the positive output terminal RD+ of the differential output 128 of the second serial Ethernet transceiver 102 is connected to the positive input terminal TD+ of the differential input 124 of the first serial Ethernet transceiver 101 by a PCB copper trace 153. Also, the negative input terminals TD− of the differential input 124 of the first and the second serial Ethernet transceivers 101 and 102 are grounded respectively. Furthermore, the first serial Ethernet transceiver 101 is connected with the third serial Ethernet transceiver 103 in such a way that the negative output terminal RD− of the differential output 128 of the first serial Ethernet transceiver 101 is connected to the negative input terminal TD− of the differential input 124 of the third serial Ethernet transceiver 103 by a PCB copper trace 151, and the positive input terminal TD+ of the input interface 124 of the third serial Ethernet transceiver 103 is grounded. In the same way, the second serial Ethernet transceiver 102 is connected with the fourth serial Ethernet transceiver 104 in such a way that the negative output terminal RD− of the differential output 128 of the second serial Ethernet transceiver 102 is connected to the negative input terminal TD− of the differential input 124 of the fourth serial Ethernet transceiver 104 by a PCB copper trace 154, and the positive input terminal TD+ of the differential input 124 of the fourth serial Ethernet transceiver 104 is grounded. Each unused differential output 128 of the third and fourth serial Ethernet transceivers 103 and 104 can be left open or terminated respectively with a resistor (not shown) with a resistor value that matches with the output impedance of the respective differential output 128. Typically, the value of the termination resistor is 100 ohm.

Figure 1:
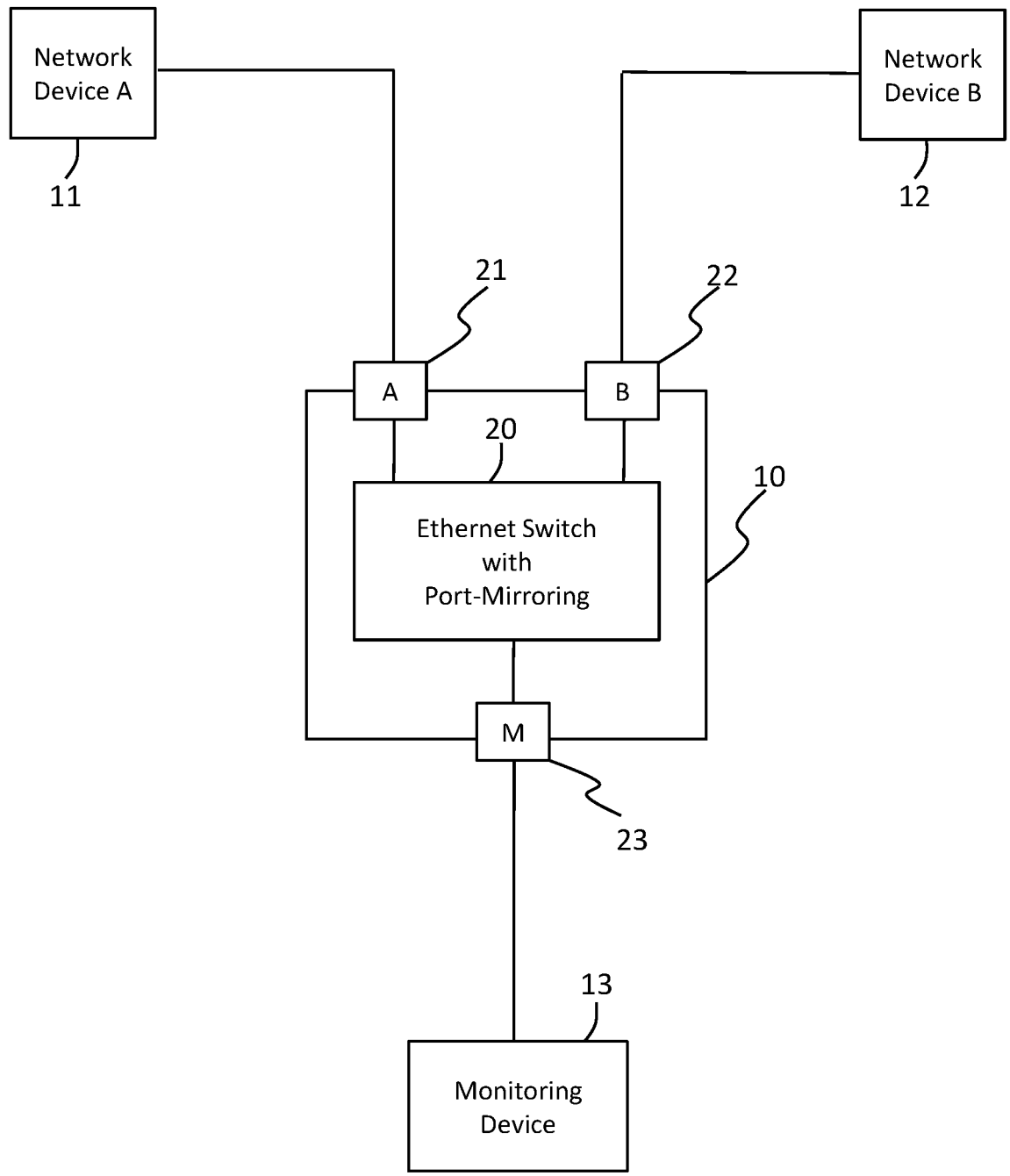
FIG. 1 is a system block diagram of a conventional network TAP.

As can be seen from FIG. 2, the differential output signal from the differential output 128 of the first serial Ethernet transceiver 101 is configured or "split" as two single-ended signals, which are carried by PCB traces 152 and 151 respectively in a "point-to-point" way to drive dedicatedly the respective differential inputs 124 of the second and third serial Ethernet transceivers 102 and 103 while each of the two differential inputs 124 of the second and third serial Ethernet transceivers 102 and 103 is configured to receive the corresponding single-ended signal. As can be understood by one skilled in the art, although the signal voltage amplitude of each of the two single-ended signals is reduced by half, as long as the reduced signal voltage amplitude is greater than the minimum input signal voltage amplitude required by the corresponding differential input 124, the single-ended signal can still be received properly. In the same way, the differential output signal from the differential output 128 of the second serial Ethernet transceiver 102 is configured or "split" as two single-ended signals, which are carried by PCB traces 153 and 154 respectively in a "point-to-point" way to drive dedicatedly the respective differential inputs 124 of the first and the fourth serial Ethernet transceivers 101 and 104 while each of the two differential inputs 124 of the first and the fourth serial Ethernet transceivers 101 and 104 is configured to receive the corresponding single-ended signal. Accordingly, as can be understood by one skilled in the art, with the four serial Ethernet transceivers 101-104 being interconnected as shown in FIG. 2, an incoming data stream received on the medium-dependent interface 110 of the first serial Ethernet transceiver 101 will be transmitted out from the medium-dependent interface 110 of the second serial Ethernet transceiver 102, and an incoming data stream received on the medium-dependent interface 110 of the second serial Ethernet transceiver 102 will be transmitted out from the medium-dependent interface 110 of the first serial Ethernet transceiver 101. As such, the medium-dependent interfaces 110 of the first and second serial Ethernet transceivers 101 and 102 function as the two "pass-through" network ports 21 and 22 of the network TAP 10 as shown in FIG. 1. On the other hand, because the two single-ended out signals from the differential output 128 of the first or second serial Ethernet transceiver 101 are identical to each other which are only phase inverted, the incoming data stream received on the medium-dependent interface 110 of the first serial Ethernet transceiver 101 will also be transmitted out from the medium-dependent interface 110 of the third serial Ethernet transceiver 103, and the incoming data stream received on the medium-dependent interface 110 of the second serial Ethernet transceiver 102 will also be is transmitted out from the medium-dependent interface 110 of the fourth serial Ethernet transceiver 104. As such, the two medium-dependent interfaces 110 of the third and fourth serial Ethernet transceivers 104 function together as the monitor port 23 of the network TAP 10 as shown in FIG. 1, each of which outputs a copy of the incoming data stream in the respective direction that passes through the network TAP 100.

As can be further seen in FIG. 2, the four serial Ethernet transceivers 101-104 are interconnected by a passive tap circuit arrangement that includes the four PCB traces 151-154. According to one aspect of the present invention, the passive tap circuit arrangement is configured to be operative at up to 10 Gbps or a higher data rate so that the network TAP 100 can be used to tap a 10 Gbps network link. This is realized by placing the four serial Ethernet transceivers 101-104 close enough on the printed circuit board so that the four PCB traces 151-154 are short enough to enable that high-speed serial Ethernet transceivers 101-104 that operate at 10 Gbps can be used. By being operative, it means that the network TAP 100 or the passive tap circuit arrangement in particular would not corrupt or cause errors to bi-directional data streams that traverse between the medium-dependent interfaces 110 of the first and second serial Ethernet transceivers 101 and 102 and each of the medium-dependent interfaces 110 of the third and fourth serial Ethernet transceivers 103 and 104 would output an uncorrupted copy of the data stream in the respective direction. Preferably, the two PCB traces 152-153 are length-matched.

As can be appreciated by one skilled in the art, the passive tap circuit arrangement advantageously avoids using any active integrated circuit (IC) chip such as an Ethernet switching IC chip or differential fan-out buffer IC chips. As such, not only the network TAP 100 according to the present invention can be used for tapping a 10 Gbps network link but also it advantageously avoids many possible technical and manufacturing issues and difficulties related to the aforementioned conventional network TAP 10.

It is to be noted that the four serial Ethernet transceivers 101-104 must be capable of operating at a same data rate in order for them to be operable with each other. The data rate is determined by the data rate of a network link with which the network TAP 100 is to be used.

Preferably, the first serial Ethernet transceiver 101 or the second serial Ethernet transceivers 102 or both has a built-in clock and data recovery (CDR) circuitry that performs on the incoming data stream received by the media-dependent interface 110. The electrical or optical signals of the incoming data stream may become very weak after transmission over a long copper or optical fiber cable run, and use of the built-in CDR circuitry can improve the reception of the incoming data stream.

Furthermore, it is to be noted that the four serial Ethernet transceivers 101-104 can be replaced by four non-Ethernet serial transceivers such as Fibre Channel based serial transceivers. Fibre Channel is a high-speed data transfer protocol that provides in-order and lossless delivery of raw block data to connect data storage to host computing servers.

According to an embodiment of the present invention, the four serial Ethernet transceivers 101-104 are implemented as small form pluggable SFP/SFP+ Ethernet transceiver modules. A SFP/SFP+ Ethernet transceiver module is a pluggable Ethernet transceiver that is in compliance with the Small Form-Factor Pluggable Transceiver Multi-Source Agreement (MSA) which is established by an industry group of manufacturers. A SFP Ethernet transceiver module and a SFP+ Ethernet transceiver module are identical mechanically, the difference is that a SFP Ethernet transceiver module is used for Gigabit Ethernet (1 Gbps), and a SFP+ Ethernet transceiver module is used for 10-Gigabit Ethernet (10 Gbps). According to the embodiment of the present invention, the network TAP 100 uses four SFP/SFP+ Ethernet transceiver modules that operate at the same data rate. As an exemplary use case of tapping a 10 Gbps short range multimode fiber optical link and sending the captured data streams to a monitoring receiver device with two 10GBase-T 10 Gbps RJ45 ports, the network TAP 100 is configured to use four SFP+10 Gbps Ethernet transceiver modules, of which two SFP+10GBase-SR 10 Gbps optical Ethernet transceiver modules are used as the first and second serial Ethernet transceiver 101 and 102, and two SFP+10 GBase-T 10 Gbps RJ45 copper Ethernet transceiver modules are used as the third and fourth serial Ethernet transceiver 103 and 104 that are respectively connected by two network cables to the two 10GBase-T 10 Gbps RJ45 ports on the monitoring receiver device. Here, 10GBase-T is an Ethernet protocol specified in IEEE 802.3 for transmission of 10-Gigabit Ethernet over a network cable of four twisted pairs such as Category 6 cable (CAT6).

As another exemplary use case, the first Ethernet transceiver 101 is configured to use a SFP+10GBase-SR 10 Gbps optical Ethernet transceiver module and the second Ethernet transceiver 102 is configured to use a SFP+10GBase-T 10 Gbps RJ45 copper Ethernet transceiver module. In this use case, the network TAP 100 becomes a 10 Gbps media converter with two monitor ports.

In this embodiment of the present invention, instead of four serial Ethernet transceivers 101-104 being permanently soldered on the PCB of the network TAP 100, only four SFP metal cages and associated connectors for accepting four pluggable SFP/SFP+ Ethernet transceiver modules are soldered on the PCB. As can be appreciated by one skilled in the art, not only the network TAP 100 doesn't need to use an Ethernet switching IC chip as a tap circuit arrangement but also it doesn't rely on using any Ethernet PHY IC chips that may be needed for implementing the four serial Ethernet transceivers. Also, with the four serial Ethernet transceivers 101-104 being pluggable modules, the network TAP 100 can be flexibly configured to tap a copper link or optical fiber link of different data rates.

Furthermore, the network TAP 100 can be configured to use four non-Ethernet SFP/SFP+ transceiver modules such as four Fibre Channel SFP/SFP+ transceiver modules. Therefore, the network TAP 100 can be used for tapping either an Ethernet link or a non-Ethernet link such as a Fibre Channel link.

Although the present invention has been described in terms of various embodiments, it is to be understood that such disclosure is not to be interpreted as limiting. Various changes and modifications will no doubt become apparent to those skilled in the art after reading the above disclosure. Accordingly, it is intended that the appended claims be interpreted as covering all changes and modifications as fall within the true spirit and scope of the invention. As a result, the invention is not limited to the specific examples and illustrations discussed above, but only the following claims and their equivalents.

What is claimed is:

1. A network test access point (TAP) capable of tapping a network link between a first network device and a second network device comprising:

a first serial transceiver, the first serial transceiver having a medium-dependent interface connectable to the first network device and a serial differential interface having a differential input interface and a differential output interface;

a second serial transceiver, the second serial transceiver having a medium-dependent interface connectable to the second network device and a serial differential interface having a differential input interface and a differential output interface;

a third serial transceiver, the third serial transceiver having a medium-dependent interface connectable to a data packet receiver device and a serial differential interface having a differential input interface; and a fourth serial transceiver, the fourth serial transceiver having a medium-dependent interface connectable to the data packet receiver device and a serial differential interface having a differential input interface, wherein the differential output interface of the first serial transceiver comprises a first output terminal and a second output terminal, the differential input interface of the second serial transceiver is configured to be operably connected to the first output terminal over a first single-ended signal connection, and the differential input interface of the third serial transceiver is configured to be operably connected to the second output terminal over a second single-ended signal connection, and wherein the differential output interface of the second serial transceiver comprises a first output terminal and a second output terminal, the differential input interface of the first serial transceiver is configured to be operably connected to the first output terminal over a third single-ended signal connection, and the differential input interface of the fourth serial transceiver is configured to be operably connected to the second output terminal over a fourth single-ended signal connection.

2. The network TAP of claim 1, wherein at least one serial transceiver selected from the first and second serial transceivers has a clock and data recovery circuitry, the clock and data recovery circuitry being operative on a data stream received by the medium dependent interface of the selected serial transceiver.

3. The network TAP of claim 1, wherein the first single-ended signal connection, the second single-ended signal connection, the third single-ended signal connection and the fourth single-ended signal connection are configured to be passively operative at a data rate up to at least 10 Gbps.

4. The network TAP of claim 1, wherein the four serial transceivers are pluggable transceiver modules operative at a same data rate adapted to the data rate of the network link.

5. The network TAP of claim 4, wherein the pluggable transceiver modules are SFP/SFP+ Ethernet transceiver modules.

6. The network TAP of claim 4, wherein the network TAP is capable of tapping either an Ethernet link or a non-Ethernet link.

7. A method of duplicating a data stream in a network test access point (TAP), the network TAP having a first network port, a second network port and a monitor port, wherein the data stream is received by the first network port and is transmitted out from the second network port and the monitor port, the method comprising:

converting the data stream received by the first network port to a differential signal, the differential signal fully representing the data stream, the differential signal being output from a differential output interface associated with the first network port, the differential output interface having a first output terminal and a second output terminal;

configuring the differential signal as a first single-ended signal available from the first output terminal and a second single-ended signal available from the second output terminal, the first single-ended signal fully representing the data stream and the second single-ended signal fully representing the data stream;

configuring a first differential input interface to be operably connected to the first output terminal of the differential output interface over a first single-ended signal connection, the first differential input interface being associated with the second network port, wherein the first single-ended signal is converted to an output signal fully representing the data stream, the output signal being transmitted from the second network port; and configuring a second differential input interface to be operably connected to second output terminal of the differential output interface over a second single-ended signal connection, the second differential input interface being associated with the monitor port, wherein the second single-ended signal is converted to an output signal fully representing the data stream, the output signal being transmitted from the monitor port.

8. The method of claim 7, wherein the first network port, the second network port and the monitor port are configured to be connected to pluggable transceiver modules operative at a same data rate adapted to the data rate of the data stream.

9. The method of claim 8, wherein the pluggable transceiver modules are SFP/SFP+ Ethernet transceiver modules.

10. The method of claim 8, wherein the network TAP is capable of tapping either an Ethernet link or a non-Ethernet link.

11. The method of claim 8, wherein the pluggable transceiver module associated with the first network port has a clock and data recovery circuitry, the clock and data recovery circuitry being operative on the data stream received by the first network port.

12. The method of claim 7, wherein the first single-ended signal connection and the second single-ended signal connection are configured to be passively operative at a data rate up to at least 10 Gbps.

13. A network access test point (TAP) capable of tapping a network link between a first network device and a second network device comprising:

a first network port configured to be connected to a SFP/SFP+ transceiver module, wherein the SFP/SFP+ transceiver comprises a medium-dependent interface connectable to the first network device and a serial differential interface having a differential input interface and a differential output interface;

a second network port configured to be connected to a SFP/SFP+ transceiver module, wherein the SFP/SFP+ transceiver comprises a medium-dependent interface connectable to the second network device and a serial differential interface having a differential input interface and a differential output interface;

a first monitor port configured to be connected to a SFP/SFP+ transceiver module, wherein the SFP/SFP+ transceiver comprises a medium-dependent interface connectable to a data packet receiver and a serial differential interface having a differential input interface and a differential output interface; and a second monitor port configured to be connected to a SFP/SFP+ transceiver module, wherein the SFP/SFP+ transceiver comprises a medium-dependent interface connectable to the data packet receiver and a serial differential interface having a differential input interface and a differential output interface, wherein the four SFP/SFP+ transceiver modules are configured to be operative at a same data rate adapted to the data rate of the network link, wherein the differential output interface of the SFP/SFP+ transceiver module of the first network port comprises a first output terminal and a second output terminal, the differential input interface of the SFP/SFP+ transceiver module of the second network port is configured to be operably connected to the first output terminal over a first single-ended signal connection, and the differential input interface of the SFP/SFP+ transceiver module of the first monitor port is configured to be operably connected to the second output terminal over a second single-ended signal connection, wherein the differential output interface of the SFP/SFP+ transceiver module of the second network port comprises a first output terminal and a second output terminal, the differential input interface of the SFP/SFP+ transceiver module of the first network port is configured to be operably connected to the first output terminal over a third single-ended signal connection, and the differential input interface of the SFP/SFP+ transceiver module of the second monitor port is configured to be operably connected to the second output terminal over a fourth single-ended signal connection, and wherein the differential output interface of the SFP/SFP+ transceiver module of the first monitor port and the differential output interface of the SFP/SFP+ transceiver module of the second monitor port are unused.

14. The network TAP of claim 13, wherein at least one SFP/SFP+ transceiver module selected from the SFP/SFP+ transceiver modules of the first and second network ports has a clock and data recovery circuitry, the clock and data recovery circuitry being operative on a data stream received by the medium dependent interface of the selected SFP/SFP+ transceiver module.

15. The network TAP of claim 13, wherein the first single-ended signal connection, the second single-ended signal connection, the third single-ended signal connection and the fourth single-ended signal connection are configured to be passively operative at a data rate up to at least 10 Gbps.

16. The network TAP of claim 13, wherein the network device is capable of tapping either an Ethernet link or a non-Ethernet link.

* * * * *